United States Patent
Tokida (10) Patent No.: US 9,981,596 B2
(45) Date of Patent: May 29, 2018

(54) VEHICLE LAMP AND VEHICLE LAMP SYSTEM

(71) Applicant: KOITO MANUFACTURING CO., LTD., Tokyo (JP)

(72) Inventor: Tsukasa Tokida, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days. days.

(21) Appl. No.: 15/355,175

(22) Filed: Nov. 18, 2016

(65) Prior Publication Data

US 2017/0144586 A1    May 25, 2017

(30) Foreign Application Priority Data

Nov. 20, 2015   (JP) .................. 2015-227750

(51) Int. Cl.
*B60Q 1/14* (2006.01)
*B60Q 1/04* (2006.01)
*F21S 8/10* (2006.01)

(52) U.S. Cl.
CPC .............. *B60Q 1/143* (2013.01); *B60Q 1/04* (2013.01); *F21S 41/141* (2018.01); *F21S 48/115* (2013.01); *B60Q 2300/112* (2013.01)

(58) Field of Classification Search
CPC .................................. B60Q 1/143; B60Q 1/04
See application file for complete search history.

(56) References Cited

U.S. PATENT DOCUMENTS

| | | | |
|---|---|---|---|
| 2003/0067786 A1* | 4/2003 | Begemann | F21S 48/1154 362/543 |
| 2007/0103923 A1* | 5/2007 | Fukawa | F21S 48/1154 362/545 |
| 2013/0235301 A1* | 9/2013 | Tamaki | G02F 1/13363 349/62 |

FOREIGN PATENT DOCUMENTS

JP   2004-095480 A   3/2004

* cited by examiner

*Primary Examiner* — Anabel Ton
(74) *Attorney, Agent, or Firm* — Osha Liang LLP

(57) ABSTRACT

A vehicle lamp system includes a first lamp unit configured to irradiate light having a first correlated color temperature, a second lamp unit configured to irradiate light having a second correlated color temperature lower than the first correlated color temperature of the first lamp unit and configured to form a combined light distribution pattern, together with the light irradiated from the first lamp unit, the combined light distribution pattern being formed by overlapping the light from the first lamp unit and the light from the second lamp unit, and a controller configured to change light flux of at least one of the first lamp unit and the second lamp unit in accordance with a vehicle speed.

12 Claims, 6 Drawing Sheets

VEHICLE LAMP AND VEHICLE LAMP SYSTEM

CROSS-REFERENCE TO RELATED APPLICATION

The present application claims priority from Japanese Patent Application No. 2015-227750 filed on Nov. 20, 2015, the entire content of which is incorporated herein by reference.

BACKGROUND

Technical Field

The present invention relates to a vehicle lamp and a vehicle lamp system.

Related Art

A vehicle lamp is adapted to improve the visibility of a driver by irradiating light to the front of a vehicle and thus forming a predetermined light distribution pattern. Conventionally, a vehicle lamp which is configured to combine a desired light distribution pattern by overlapping a plurality of light distribution patterns has been suggested (Patent Document 1).

Patent Document 1: Japanese Patent Laid-Open Publication No. 2004-95480

In order to secure the safety of a driver or pedestrian or the like, further improvement in the visibility of the driver is always required for a vehicle lamp.

SUMMARY

Exemplary embodiments of the invention provide a vehicle lamp and a vehicle lamp system which provide a technique capable of improving the visibility of a driver.

A vehicle lamp system according to an exemplary embodiment of the invention comprises:

a first lamp unit configured to irradiate light having a first correlated color temperature;

a second lamp unit configured to irradiate light having a second correlated color temperature lower than the first correlated color temperature of the first lamp unit and configured to form a combined light distribution pattern, together with the light irradiated from the first lamp unit, the combined light distribution pattern being formed by overlapping the light from the first lamp unit and the light from the second lamp unit; and a controller configured to change light flux of at least one of the first lamp unit and the second lamp unit in accordance with a vehicle speed According to this aspect, the second lamp unit is controlled to irradiate a relatively wide range, the light flux of the first lamp unit is controlled to increase when the vehicle speed is high, and the light flux of the second lamp unit is controlled to increase when the vehicle speed is low. In this way, it is possible to improve the visibility for the distant area during high-speed travelling. Further, it is possible to improve the visibility for the area relatively close to an own vehicle while suppressing the glare for pedestrians or oncoming vehicles during low-speed travelling. That is, it is possible to improve the visibility of a driver.

The first lamp unit may form a light distribution pattern smaller than a light distribution pattern formed by the second lamp unit.

A difference between the first correlated color temperature of the light irradiated from the first lamp unit and the second correlated color temperature of the light irradiated from the second lamp unit may be equal to or greater than 500K.

The controller may increase the light flux of the first lamp unit in response to an increase in the vehicle speed.

The vehicle lamp system may further comprise:

a third lamp unit configured to irradiate light having a third correlated color temperature lower than that of the second lamp unit and configured to form a combined light distribution pattern, together with the light irradiated from the first lamp unit and the second lamp unit, the combined light distribution pattern being formed by overlapping the light from the third lamp unit and the light from the first lamp unit and the second lamp unit, wherein the third lamp unit forms a light distribution pattern larger than a light distribution pattern formed by the second lamp unit.

Another aspect of the present invention is a vehicle lamp. The vehicle lamp comprises:

a first lamp unit configured to irradiate light having a first correlated color temperature;

a second lamp unit configured to irradiate light having a second correlated color temperature lower than the first correlated color temperature of the first lamp unit and configured to form a combined light distribution pattern, together with the light irradiated from the first lamp unit, the combined light distribution pattern being formed by overlapping the light from the first lamp unit and the light from the second lamp unit; and a controller configured to change light flux of at least one of the first lamp unit and the second lamp unit in accordance with a vehicle speed.

Meanwhile, one obtained by any combinations of the above components or replacement of the components or expressions of the present invention among a method, a device or a system and the like is also effective as an aspect of the present invention.

According to one aspect of the present invention, it is possible to improve the visibility of a driver.

DETAILED DESCRIPTION

Hereinafter, a preferred embodiment of the present invention will be described with reference to the drawings. The same or similar elements, members and process shown in each of the drawings are denoted by the same or similar reference numerals and a duplicated description thereof will be omitted, as appropriate. Further, the embodiment is illustrative and is not intended to limit the present invention. It should be noted that all the features and their combinations described in the embodiments are not necessarily considered as an essential part of the present invention.

Figure 1:
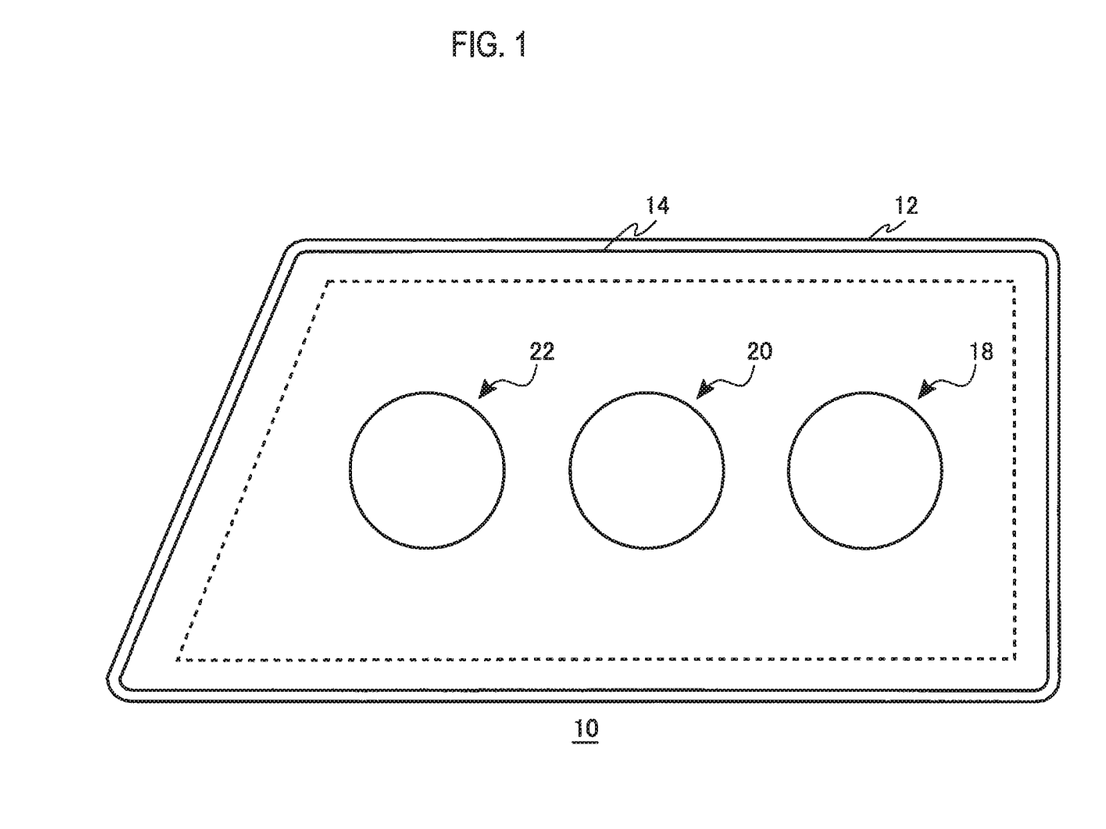
FIG. 1 is a front view of a vehicle lamp according to an embodiment.

FIG. 1 is a front view showing a configuration of a vehicle lamp 10 according to an embodiment. The vehicle lamp 10 is respectively disposed on both left and right sides of a front portion of a vehicle body and serves as a low-beam headlamp. FIG. 1 shows the vehicle lamp 10 located on the right side, as seen from the front of the vehicle body. The vehicle lamp 10 includes a lamp body 12, a translucent cover 14, a first lamp unit 18, a second lamp unit 20 and a third lamp unit 22.

The lamp body 12 is formed into a box shape having an opening. The translucent cover 14 is attached to this opening. The first lamp unit 18, the second lamp unit 20 and the third lamp unit 22 are disposed inside a lamp chamber which is defined by the lamp body 12 and the translucent cover 14. Each of the first lamp unit 18, the second lamp unit 20 and the third lamp unit 22 is, for example, a projector-type optical unit and forms a low-beam light distribution pattern.

Each lamp unit is configured to irradiate light having the correlated color temperature different from each other. The first lamp unit 18 is configured to irradiate light having the correlated color temperature of Tc1 (e.g., 6500K), the second lamp unit 20 is configured to irradiate light having the correlated color temperature of Tc2 (e.g., 5000K) lower than Tc1, and the third lamp unit 22 is configured to irradiate light having the correlated color temperature of Tc3 (e.g., 3200K) lower than Tc2. In the present embodiment, each lamp unit is configured such that a difference in the correlated color temperature of the light irradiated from each lamp unit is equal to or greater than 500K. That is, each lamp unit is configured such that $Tc1-Tc2 \geq 500K$ and $Tc2-Tc3 \geq 500K$ are satisfied. When the difference in the correlated color temperature is equal to or greater than 500K, a person can recognize a difference in color of light.

Figure 2:
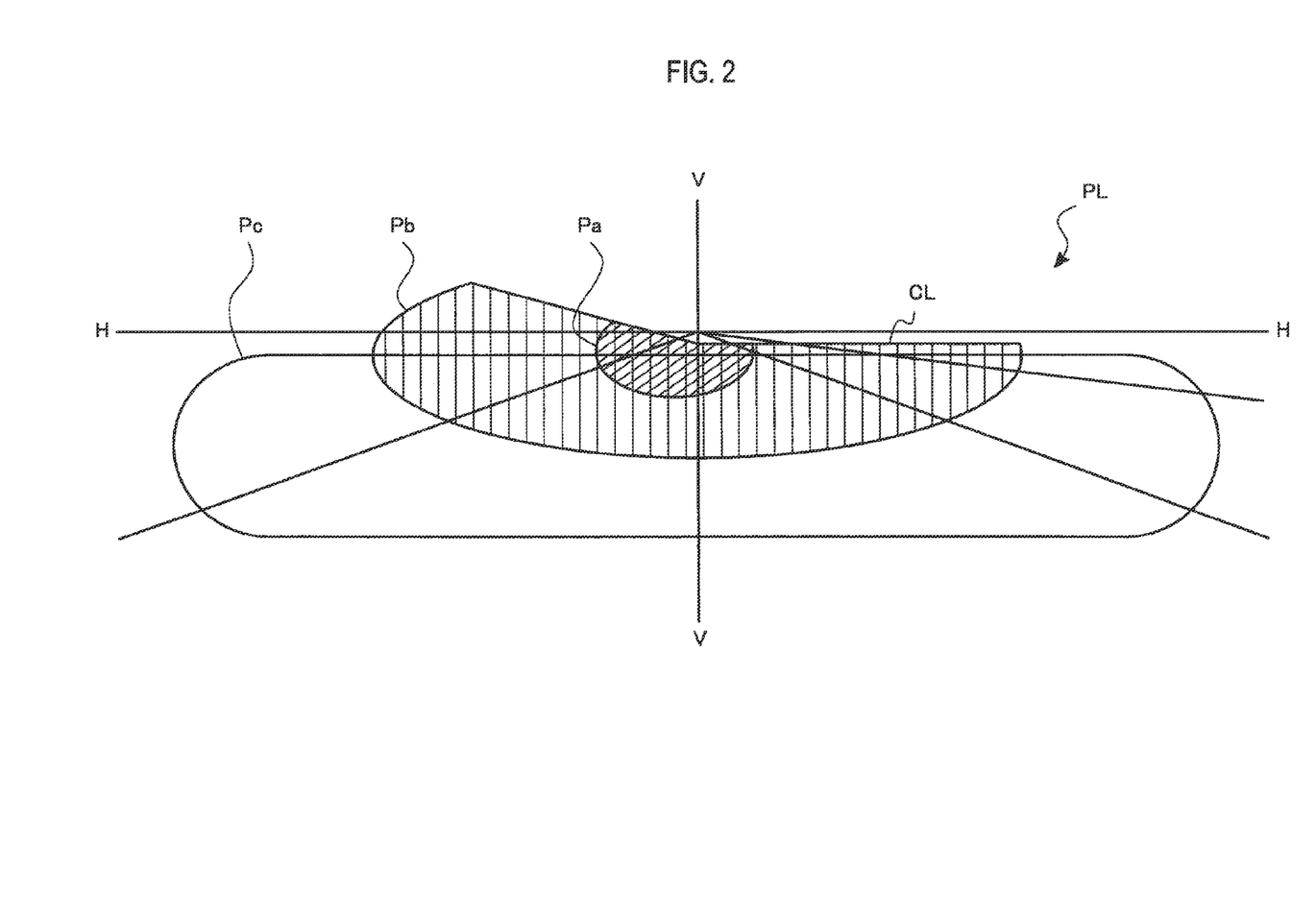
FIG. 2 is a view schematically showing a low-beam light distribution pattern formed by the vehicle lamp shown in FIG. 1.

FIG. 2 is a view schematically showing a low-beam light distribution pattern PL formed by the vehicle lamp 10. The light distribution pattern PL is a light distribution pattern having a cut-off line of a predetermined shape and is formed by the overlapping of a condensing light distribution pattern Pa, a medium-diffusion light distribution pattern Pb and a large-diffusion light distribution pattern Pc.

The condensing light distribution pattern Pa is a relatively small light distribution pattern for irradiating an area to be called a hot zone, which is located near an H-V point that is an intersection of a vertical line V and a horizontal line H and which requires for high luminous intensity. The condensing light distribution pattern Pa is formed by the first lamp unit 18.

The medium-diffusion light distribution pattern Pb is a light distribution pattern diffused in a horizontal direction and has a cut-off line CL of a predetermined shape. The medium-diffusion light distribution pattern Pb is formed to be larger than the condensing light distribution pattern Pa and to be overlapped with at least a portion of the condensing light distribution pattern Pa. In the present embodiment, the medium-diffusion light distribution pattern Pb is formed so as to cover substantially the whole of the condensing light distribution pattern Pa. The medium-diffusion light distribution pattern Pb is formed by the second lamp unit 20.

The large-diffusion light distribution pattern Pc is a light distribution pattern diffused in the horizontal direction. The large-diffusion light distribution pattern Pc is formed to be larger than the condensing light distribution pattern Pa and to be overlapped with at least a portion of each of the condensing light distribution pattern Pa and the medium-diffusion light distribution pattern Pb. In the present embodiment, the large-diffusion light distribution pattern Pc is formed so as to cover most of the condensing light distribution pattern Pa and most of the medium-diffusion light distribution pattern Pb. The large-diffusion light distribution pattern Pc is formed by the third lamp unit 22.

Specifically, in the present embodiment, the lamp units are configured such that the higher the light-condensing degree is (i.e., the lower the diffusion degree is), the higher the correlated color temperature of light irradiated is.

Figure 3A:
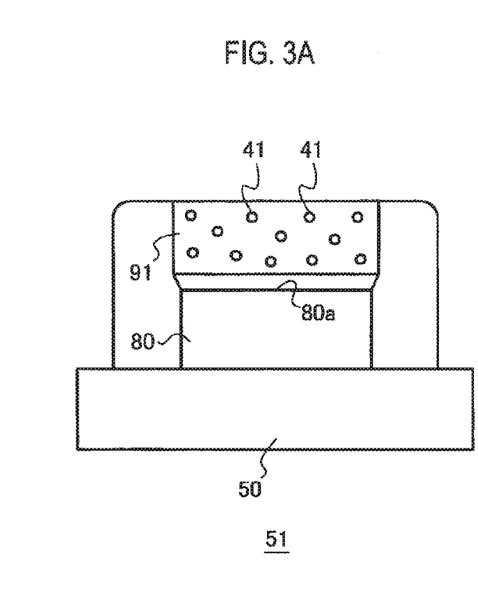
FIGS. 3A to 3C are schematic sectional views of a light source included in each lamp unit shown in FIG. 1.
Figure 3B:
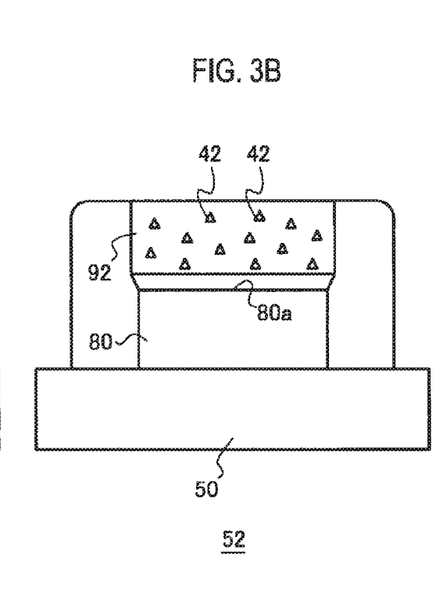
Figure 3C:
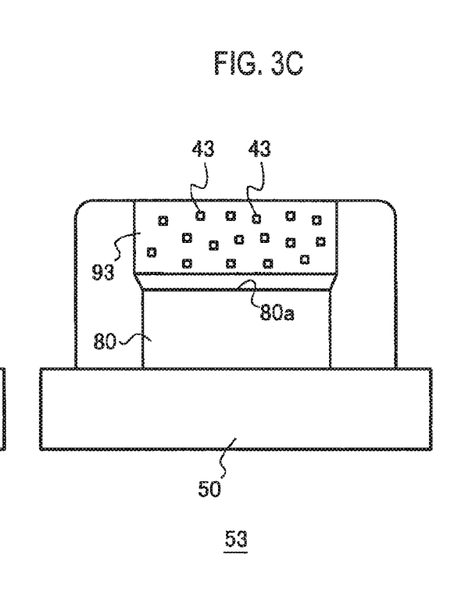

FIGS. 3A to 3C are schematic sectional views of a light source included in each lamp unit. FIG. 3A shows a first light source 51 included in the first lamp unit 18, FIG. 3B shows a second light source 52 included in the second lamp unit 20, and FIG. 3C shows a third light source 53 included in the third lamp unit 22.

The first light source 51 includes a substrate 50, an LED element (light emitting element) 80 and a first wavelength conversion member 91. The second light source 52 includes a substrate 50, an LED element 80 and a second wavelength conversion member 92. The third light source 53 includes a substrate 50, an LED element 80 and a third wavelength conversion member 93.

The substrate 50 is formed into a flat-plate shape by a material having high thermal conductivity. As described above, each of the light sources includes the LED element 80. Namely, each of the light sources includes an LED element which emits light having a dominant wavelength in substantially the same wavelength range.

Each of the first wavelength conversion member 91, the second wavelength conversion member 92 and the third wavelength conversion member 93 is disposed on an optical path of the corresponding LED element 80. In the present embodiment, each of the first wavelength conversion member 91, the second wavelength conversion member 92 and the third wavelength conversion member 93 is disposed so as to face a light emitting surface 80a of the corresponding LED element 80.

The first wavelength conversion member 91, the second wavelength conversion member 92 and the third wavelength conversion member 93 include a first phosphor 41, a second phosphor 42 and a third phosphor 43, respectively. Each phosphor absorbs a portion of light emitted from the corresponding LED element 80 and emits light having a wavelength different from the light emitted from the LED element 80.

In the present embodiment, at least one of the following configurations (1) to (3) in each light source is different. In this way, each light source can irradiate light having the correlated color temperature different from each other on the basis of the light of the LED element 80, which has a dominant wavelength in substantially the same wavelength range.

(1) Composition of the first phosphor 41, composition of the second phosphor 42 and composition of the third phosphor 43

(2) Concentration of the first phosphor 41 included in the first wavelength conversion member 91, concentration of the second phosphor 42 included in the second wavelength conversion member 92 and concentration of the third phosphor 43 included in the third wavelength conversion member 93

(3) Thickness of the first wavelength conversion member 91, thickness of the second wavelength conversion member 92 and thickness of the third wavelength conversion member 93

As an example, the LED element 80 emits light having a dominant wavelength in a wavelength range of 420 to 490 nm. The first wavelength conversion member 91 converts a portion of the light emitted from the LED element 80 into light having a dominant wavelength in a wavelength range of 560 to 570 nm and allows at least a portion other than the portion of the light emitted from the LED element 80 to be transmitted therethrough. In this way, the first light source 51 and thus the first lamp unit 18 irradiates light having the correlated color temperature of Tc1, in which the light transmitted through the first wavelength conversion member 91 and the light wavelength-converted by the first wavelength conversion member 91 are mixed.

The second wavelength conversion member 92 converts a portion of the light emitted from the LED element 80 into light having a dominant wavelength in a wavelength range of 570 to 575 nm and allows at least a portion other than the portion of the light emitted from the LED element 80 to be transmitted therethrough. In this way, the second light source 52 and thus the second lamp unit 20 irradiates light having the correlated color temperature of Tc2, in which the light transmitted through the second wavelength conversion member 92 and the light wavelength-converted by the second wavelength conversion member 92 are mixed.

The third wavelength conversion member 93 converts a portion of the light emitted from the LED element 80 into light having a dominant wavelength in a wavelength range of 575 to 585 nm and allows at least a portion other than the portion of the light emitted from the LED element 80 to be transmitted therethrough. In this way, the third light source 53 and thus the third lamp unit 22 irradiates light having the correlated color temperature of Tc3, in which the light transmitted through the third wavelength conversion member 93 and the light wavelength-converted by the third wavelength conversion member 93 are mixed.

Figure 4:
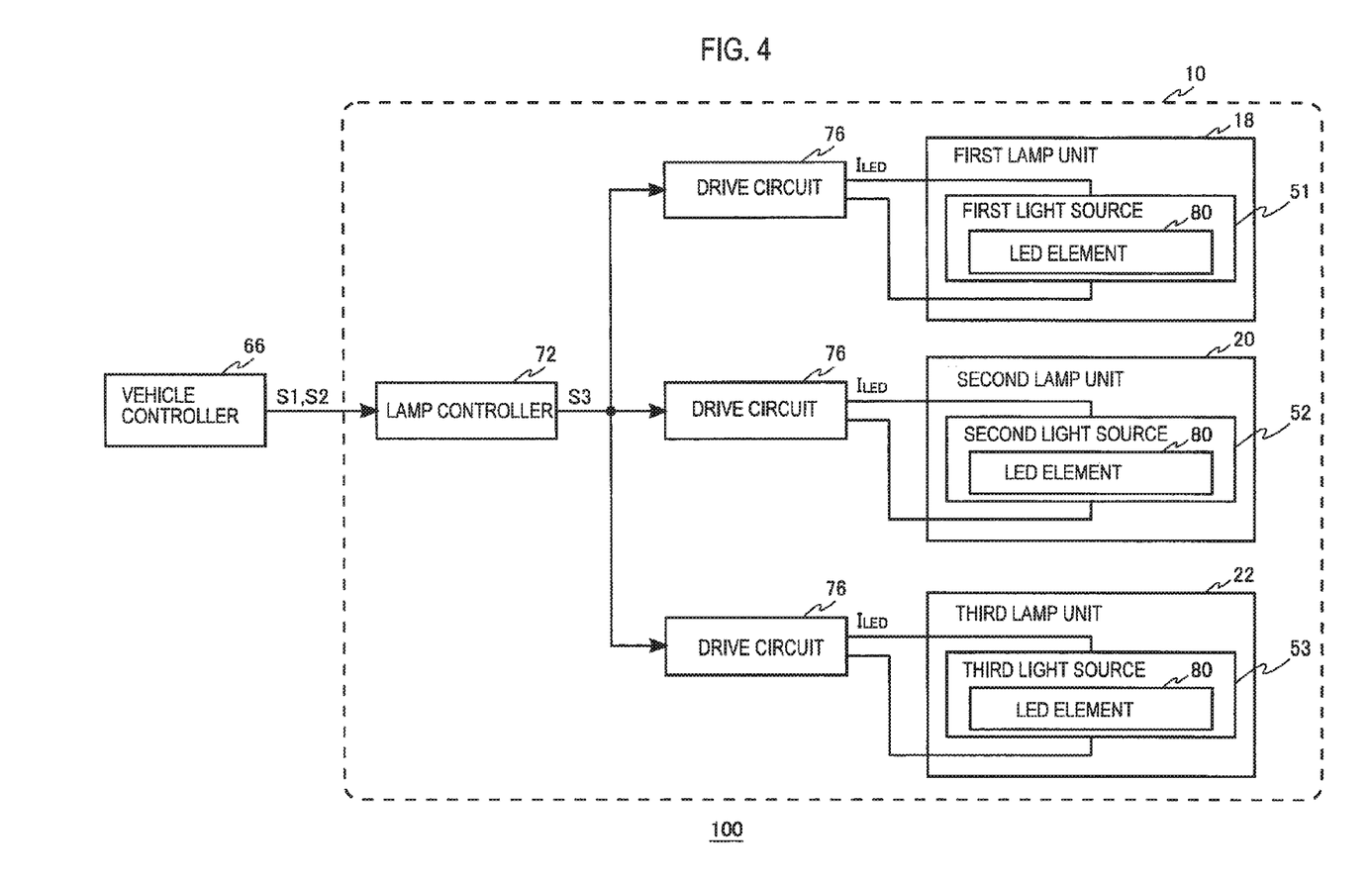
FIG. 4 is a block diagram showing a vehicle lamp system including the vehicle lamp shown in FIG. 1.

FIG. 4 is a block diagram showing a vehicle lamp system 100 including the vehicle lamp 10 shown in FIG. 1. The vehicle lamp system 100 includes the vehicle lamp 10 and a vehicle controller 66.

The vehicle controller 66 controls the vehicle lamp 10 in an integrated manner. The vehicle controller 66 transmits, to the vehicle lamp 10, a turning on/off command S1 for the on/off of the lamp and an information (travelling information) S2 indicating a travelling condition, and the like. The turning on/off command S1 includes an adjustment command from a user for the light flux (hereinafter, the light flux of light irradiated from the lamp unit is simply referred to as "light flux of lamp unit) of light irradiated from each lamp unit, in addition to the on/off instruction for each lamp unit from the user. The travelling information S2 includes a vehicle speed.

The vehicle lamp 10 further includes a lamp controller 72 and three drive circuits 76. The lamp controller 72 separately controls the first lamp unit 18, the second lamp unit 20 and the third lamp unit 22 based on the turning on/off command S1 and the travelling information S2 from the vehicle controller 66. Specifically, the lamp controller 72 generates a dimming signal S3 based on the turning on/off command S1 and the travelling information S2. Each of the drive circuits 76 supplies a drive current $I_{LED}$ according to the dimming signal S3 to the LED element 80.

During high-speed travelling, the lamp controller 72 is controlled such that a lamp unit, in which the light-condensing degree is high and the correlated color temperature of the light irradiated is relatively high, is brightened. Specifically, the lamp controller 72 controls the first lamp unit 18 such that the light flux of the first lamp unit 18 to form the condensing light distribution pattern Pa is increased (i.e., the brightness of the LED element 80 of the first light source is increased) when the vehicle speed indicated by the travelling information S2 is equal to or greater than a first speed (e.g., 60 km/h). Further, in addition to the first lamp unit 18, the lamp controller 72 may control the second lamp unit 20 such that the light flux of the second lamp unit 20 to form the medium-diffusion light distribution pattern Pb is increased (i.e., the brightness of the LED element 80 of the second light source is increased). In this case, the lamp controller 72 may control the third lamp unit 22 such that the light flux of the third lamp unit 22 to form the large-diffusion light distribution pattern Pc is decreased (i.e., the brightness of the LED element 80 of the third light source is decreased).

Further, during medium-speed travelling, the lamp controller 72 is controlled such that a lamp unit, in which the light-condensing degree (i.e., diffusion degree) is almost moderate and the correlated color temperature of the light irradiated is almost moderate, is brightened. Specifically, the lamp controller 72 controls the second lamp unit 20 such that the light flux of the second lamp unit 20 to form the medium-diffusion light distribution pattern Pb is increased (i.e., the brightness of the LED element 80 of the second light source is increased) when the vehicle speed indicated by the travelling information S2 is less than the first speed but equal to or greater than a second speed (e.g., 40 km/h). In this case, the lamp controller 72 may control the first lamp unit 18 and the third lamp unit 22 such that the light flux of the first lamp unit 18 to form the condensing light distribution pattern Pa and the light flux of the third lamp unit 22 to form the large-diffusion light distribution pattern Pc are decreased.

Further, during low-speed travelling, the lamp controller 72 is controlled such that a lamp unit, in which the light-condensing degree is low (i.e., diffusion degree is high) and the correlated color temperature of the light irradiated is relatively low, is brightened. Specifically, the lamp controller 72 controls the third lamp unit 22 such that the light flux of the third lamp unit 22 to form the large-diffusion light distribution pattern Pc is increased when the vehicle speed indicated by the travelling information S2 is less than the second speed but equal to or greater than a third speed (e.g., 0 km/h, i.e., stopped state). Further, in addition to the third lamp unit 22, the lamp controller 72 may control the second lamp unit 20 such that the light flux of the second lamp unit 20 to form the medium-diffusion light distribution pattern Pb is increased. In this case, the lamp controller 72 may control the first lamp unit 18 such that the light flux of the first lamp unit 18 to form the condensing light distribution pattern Pa is decreased.

Further, the lamp controller 72 controls the first lamp unit 18, the second lamp unit 20 and the third lamp unit 22 based on the adjustment instruction from a user for the light flux of each lamp unit, which is included in the turning on/off command S1. For example, when the turning on/off command S1 includes an instruction to brighten the lamp unit with high light-condensing degree, the lamp controller 72 controls the first lamp unit 18 such that the light flux of the first lamp unit 18 to form the condensing light distribution pattern Pa is increased. Further, for example, when the turning on/off command S1 includes an instruction to brighten the lamp unit with medium diffusion degree, the lamp controller 72 controls the second lamp unit 20 such that the light flux of the second lamp unit 20 to form the medium-diffusion light distribution pattern Pb is increased. Further, for example, when the turning on/off command S1 includes an instruction to brighten the lamp unit with high diffusion degree, the lamp controller 72 controls the third lamp unit 22 such that light flux of the third lamp unit 22 to form the large-diffusion light distribution pattern Pc is increased.

According to the vehicle lamp system 100 of the present embodiment described above, the lamp units are configured such that the higher the light-condensing degree of light irradiated is (conversely, the lower the diffusion degree is), the higher the correlated color temperature of the light irradiated is. Further, the light flux of each lamp unit is controlled to be changed in accordance with the vehicle speed. In particular, when the vehicle speed is high, the light flux of the lamp unit, in which the light-condensing degree is high and the correlated color temperature of light irradiated is relatively high, is controlled to increase. In other words, when the vehicle speed is high, the light flux of the lamp unit, which irradiates a so-called hot zone and in which the correlated color temperature is relatively high, is controlled to increase. Further, when the vehicle speed is almost moderate, the light flux of the lamp unit, in which the light-condensing degree is almost moderate and the correlated color temperature of light irradiated is almost moderate, is controlled to increase. Further, when the vehicle speed is low, the light flux of the lamp unit, in which the light-condensing degree is low (i.e., the diffusion degree is high) and the correlated color temperature of light irradiated is relatively low, is controlled to increase. In this way, it is possible to improve the visibility for the distant area during high-speed travelling. Further, it is possible to improve the visibility for the relatively distant area while suppressing the glare for pedestrians or oncoming vehicles during medium-speed travelling. Moreover, it is possible to improve the visibility for the area relatively close to an own vehicle while suppressing the glare for pedestrians or oncoming vehicles during low-speed travelling (i.e., during city travelling). That is, according to the vehicle lamp system 100 of the present embodiment, it is possible to improve the visibility of a driver.

In the foregoing, a configuration and operation of a light source module according to the embodiment have been described. It is understood by those skilled in the art that the embodiment is illustrative and various modifications to the combinations of each component in the above embodiment are possible and these modifications fall within the scope of the present invention.

First Modification

Figure 5A:
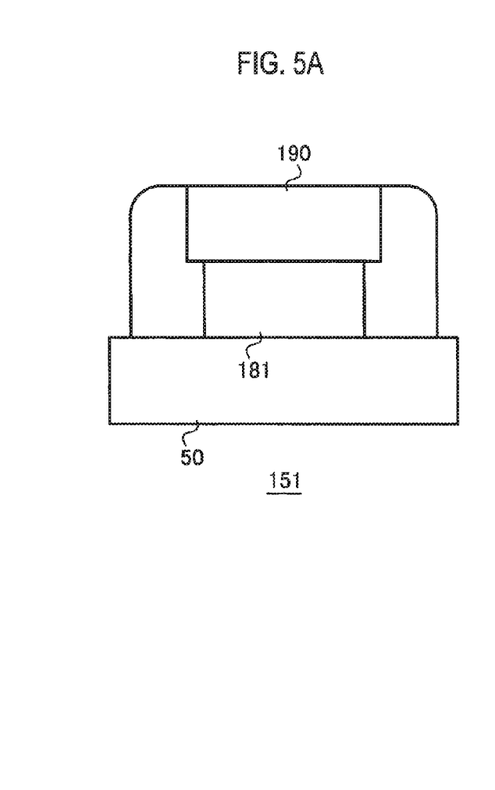
FIGS. 5A to 5C are schematic sectional views of a light source included in each lamp unit of a vehicle lamp according to a modification of the embodiment.
Figure 5B:
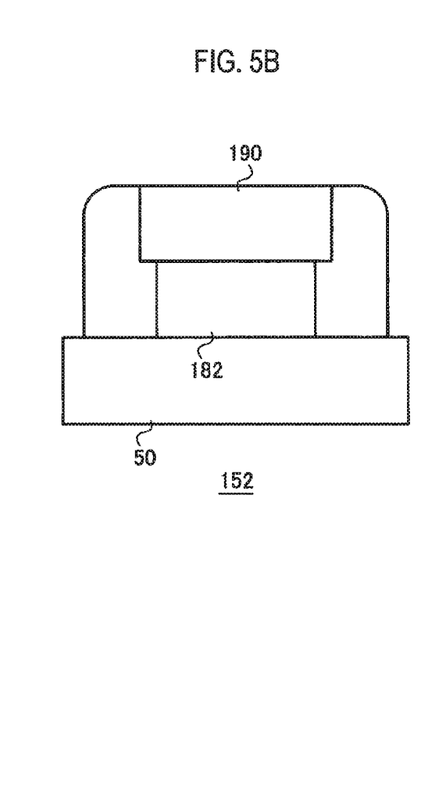
Figure 5C:
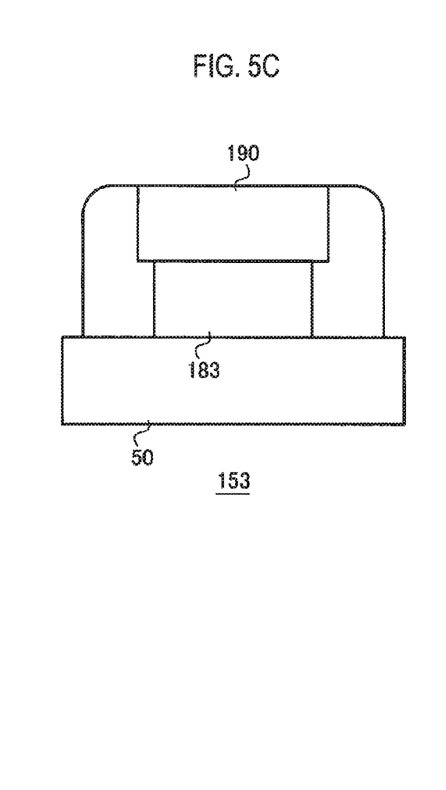

FIGS. 5A to 5C are schematic sectional views of a light source included in each lamp unit of a vehicle lamp according to a modification of the embodiment. FIG. 5A shows a first light source 151 included in the first lamp unit 18, FIG. 5B shows a second light source 152 included in the second lamp unit 20, and FIG. 5C shows a third light source 153 included in the third lamp unit 22.

The first light source 151 includes the substrate 50, a first LED element 181 and a wavelength conversion member 190. The second light source 152 includes the substrate 50, a second LED element 182 and a wavelength conversion member 190. The third light source 153 includes the substrate 50, a third LED element 183 and a wavelength conversion member 190.

In the present modification, each light source includes an LED element different from each other, as described above. That is, each light source includes an LED element which emits light having a dominant wavelength in a different wavelength range.

Further, each of the light sources includes the wavelength conversion member 190. That is, respective light sources include the wavelength conversion members in which composition and concentration of the phosphor and the thickness are substantially the same. The phosphor included in the wavelength conversion member 190 absorbs a portion of light emitted from the first LED element 181, the second LED element 182 or the third LED element 183 and emits light having a wavelength different from the light emitted from these LED elements.

The first light source 151 irradiates light having the correlated color temperature of Tc1, in which the light emitted from the first LED element 181 and transmitted through the wavelength conversion member 190 and the light wavelength-converted by the wavelength conversion member 190 are mixed. The second light source 152 irradiates light having the correlated color temperature of Tc2, in which the light emitted from the second LED element 182 and transmitted through the wavelength conversion member 190 and the light wavelength-converted by the wavelength conversion member 190 are mixed. The third light source 153 irradiates light having the correlated color temperature of Tc3, in which the light emitted from the third LED element 183 and transmitted through the wavelength conversion member 190 and the light wavelength-converted by the wavelength conversion member 190 are mixed. That is, in the present embodiment, the LED elements of the first light source 151, the second light source 152 and the third light source 153 respectively emit light having a dominant wavelength in different wavelength range, so that these light sources irradiate light having the correlated color temperature different from each other.

As an example, the first LED element 181, the second LED element 182 and the third LED element 183 emit light having a dominant wavelength in a wavelength range of 435 nm, 450 nm and 470 nm, respectively.

According to the present modification, the same effects as the vehicle lamp 10 according to the embodiment can be achieved.

Second Modification

Figure 6A:
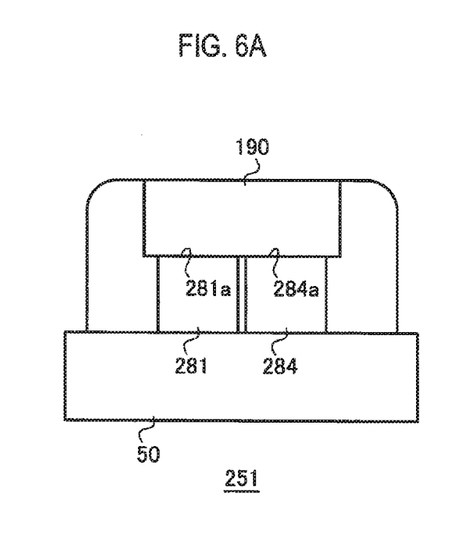
FIGS. 6A to 6C are schematic sectional views of a light source included in each lamp unit of a vehicle lamp according to another modification of the embodiment.
Figure 6B:
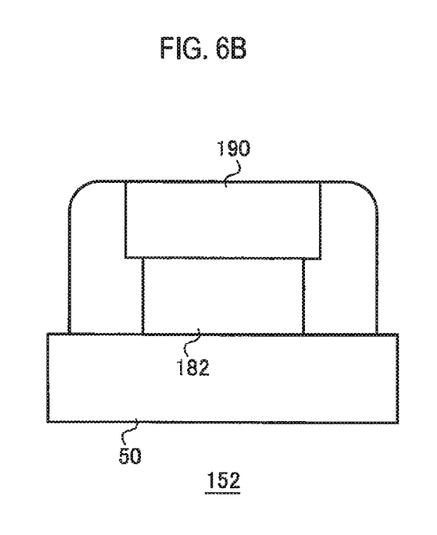
Figure 6C:
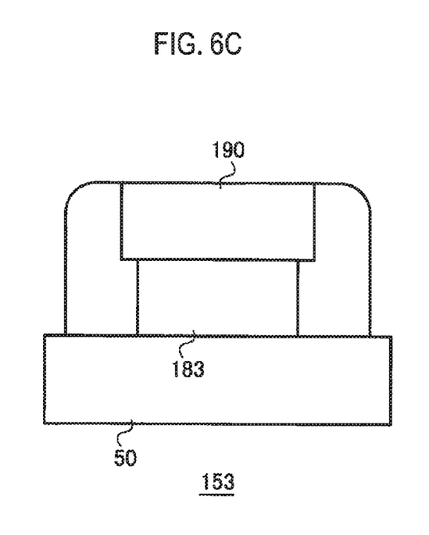

FIGS. 6A to 6C are schematic sectional views of a light source included in each lamp unit of a vehicle lamp according to another modification of the embodiment. FIG. 6A shows a first light source 251 included in the first lamp unit 18, FIG. 6B shows a second light source 152 included in the second lamp unit 20, and FIG. 6C shows a third light source 153 included in the third lamp unit 22.

The first light source 251 includes a first LED element 281, a fourth LED element 284 and the wavelength conversion member 190. That is, the first light source 251 includes two kinds of LED elements. The wavelength conversion member 190 is disposed on an optical path of the first LED element 281 and the fourth LED element 284. In the present embodiment, the wavelength conversion member 190 is disposed so as to face a light emitting surface 281a of the first LED element 281 and a light emitting surface 284a of the fourth LED element 284.

A portion of the light emitted from the first LED element 281 is wavelength-converted by the wavelength conversion member 190 and at least a portion other than the portion of the light emitted from the first LED element 281 is transmitted through the wavelength conversion member 190. On the other hand, the light emitted from the fourth LED element 284 is substantially transmitted through the wavelength conversion member 190. For example, 50% or more of the light emitted from the fourth LED element 284 may be transmitted through the wavelength conversion member 190.

White light having the correlated color temperature of Tc1 is generated on the basis of the light wavelength-converted by the wavelength conversion member 190, the light emitted from the first LED element 281 and transmitted through the wavelength conversion member 190, and the light emitted from the fourth LED element 284 and substantially transmitted through the wavelength conversion member 190.

As an example, the first LED element 281 emits blue light having a dominant wavelength in a wavelength range of 420 to 490 nm. The fourth LED element 284 emits umber to red light having a dominant wavelength in a wavelength range of 577 to 700 nm.

The wavelength conversion member 190 converts a portion of the blue light emitted from the first LED element 281 into yellow light having a dominant wavelength in a wavelength range of 560 to 582 nm and allows at least a portion other than the portion of the blue light emitted from the first LED element 281 to be transmitted therethrough. Further, the wavelength conversion member 190 allows the umber to red light emitted from the fourth LED element 284 to be substantially transmitted therethrough. For example, the wavelength conversion member 190 may allow 50% or more of the umber to red light emitted from the fourth LED element 284 to be transmitted therethrough.

In the present modification, the wavelength conversion member 190 includes a phosphor. The phosphor absorbs a portion of the blue light emitted from the first LED element 281 and emits yellow light in Lambertian. At least a portion other than the portion of the light emitted from the first LED element 281 is emitted from the wavelength conversion member 190 without being absorbed by the phosphor. Further, the umber light emitted from the fourth LED element 284 is emitted from the wavelength conversion member 190 without being substantially absorbed by the phosphor (e.g., while 50% or more of the umber light is not absorbed by the phosphor). In particular, the umber to red light emitted from the fourth LED element 284 is diffused in the wavelength conversion member 190 and emitted from the wavelength conversion member 190.

The blue light transmitted through the wavelength conversion member 190 and the light converted into yellow light by the wavelength conversion member 190 are mixed, thereby generating white light. In the present embodiment, the umber light transmitted through the wavelength conversion member 190 is further mixed to the white light. By changing the light flux of the umber light mixed to the white light, it is possible to change the correlated color temperature Tc1 of the white light.

According to the present modification, the same effects as the vehicle lamp 10 according to the embodiment can be achieved. In addition, according to the present modification, it is possible to adjust the correlated color temperature of light from the first light source 251.

Meanwhile, in the present modification, an example where the first light source 251 includes one first LED element 281 and one fourth LED element 284 has been described. However, the present invention is not limited thereto. The first light source may include a plurality of first LED elements 281 or may include a plurality of fourth LED elements 284. Further, at least one of the second light source and the third light source may be configured similarly to the first light source 251. That is, at least one of the second light source and the third light source may additionally include an LED element for emitting light which is substantially transmitted through the wavelength conversion member 190.

Third Modification

In the embodiment, an example where each lamp unit includes one light source has been described. However, the present invention is not limited thereto. Each lamp unit may include two or more light sources.

What is claimed is:

1. A vehicle lamp system comprising:
a first lamp unit configured to irradiate light having a first correlated color temperature;
a second lamp unit configured to irradiate light having a second correlated color temperature lower than the first correlated color temperature of the first lamp unit and configured to form a combined light distribution pattern, together with the light irradiated from the first lamp unit, the combined light distribution pattern being formed by overlapping the light from the first lamp unit and the light from the second lamp unit; and
a controller configured to increase a light flux of the first lamp unit from a first light flux greater than zero to a second light flux greater than the first light flux, or increase a light flux of the second lamp unit from a third light flux greater than zero to a fourth light flux greater than the third light flux, in accordance with change in vehicle speed.

2. The vehicle lamp system according to claim 1, wherein the first lamp unit forms a light distribution pattern smaller than a light distribution pattern formed by the second lamp unit.

3. The vehicle lamp system according to claim 1, wherein a difference between the first correlated color temperature of the light irradiated from the first lamp unit and the second correlated color temperature of the light irradiated from the second lamp unit is equal to or greater than 500K.

4. The vehicle lamp system according to claim 1, wherein the controller increases the light flux of the first lamp unit from the first light flux to the second light flux in response to an increase in the vehicle speed.

5. A vehicle lamp system comprising:
a first lamp unit configured to irradiate light having a first correlated color temperature;
a second lamp unit configured to irradiate light having a second correlated color temperature lower than the first correlated color temperature of the first lamp unit and configured to form a combined light distribution pattern, together with the light irradiated from the first lamp unit, the combined light distribution pattern being formed by overlapping the light from the first lamp unit and the light from the second lamp unit;
a controller configured to change light flux of at least one of the first lamp unit and the second lamp unit in accordance with a vehicle speed; and
a third lamp unit configured to irradiate light having a third correlated color temperature lower than that of the second lamp unit and configured to form a combined light distribution pattern, together with the light irradiated from the first lamp unit and the second lamp unit, the combined light distribution pattern being formed by overlapping the light from the third lamp unit and the light from the first lamp unit and the second lamp unit,
wherein the third lamp unit forms a light distribution pattern larger than a light distribution pattern formed by the second lamp unit.

6. A vehicle lamp comprising:
a first lamp unit configured to irradiate light having a first correlated color temperature;
a second lamp unit configured to irradiate light having a second correlated color temperature lower than the first correlated color temperature of the first lamp unit and configured to form a combined light distribution pattern, together with the light irradiated from the first lamp unit, the combined light distribution pattern being formed by overlapping the light from the first lamp unit and the light from the second lamp unit; and a controller configured to increase a light flux of the first lamp unit from a first light flux greater than zero to a second light flux greater than the first light flux, or increase a light flux of the second lamp unit from a third light flux greater than zero to a fourth light flux greater than the third light flux, in accordance with change in vehicle speed.

7. The vehicle lamp system according to claim 1, wherein the controller increases the light flux of the second lamp unit from the third light flux to the fourth light flux in response to a decrease in the vehicle speed.

8. The vehicle lamp system according to claim 4, wherein the controller increases the light flux of the second lamp unit from the third light flux to the fourth light flux in response to a decrease in the vehicle speed.

9. The vehicle lamp system according to claim 1, wherein the second lamp unit forms a light distribution pattern wider than that formed by the first lamp unit.

10. The vehicle lamp system according to claim 4, wherein the second lamp unit forms a light distribution pattern wider than that formed by the first lamp unit.

11. The vehicle lamp system according to claim 7, wherein the second lamp unit forms a light distribution pattern wider than that formed by the first lamp unit.

12. The vehicle lamp system according to claim 8, wherein the second lamp unit forms a light distribution pattern wider than that formed by the first lamp unit.

\* \* \* \* \*